United States Patent [19]

Richard

[11] Patent Number: 4,715,142

[45] Date of Patent: Dec. 29, 1987

[54] SELF-DESTRUCT FISH HOOK

[76] Inventor: Joseph D. Richard, 531 S. Navy Blvd., Pensacola, Fla. 32507

[21] Appl. No.: 46,702

[22] Filed: May 7, 1987

[51] Int. Cl.$^4$ ............................................... A01K 97/02
[52] U.S. Cl. ................................................... 43/43.16
[58] Field of Search ..................... 43/43.16, 100; 441/8

[56] References Cited

U.S. PATENT DOCUMENTS 3,842,529 10/1974 Richard ............................. 43/44.99
3,992,804 11/1976 Senese ................................... 43/100
4,583,314 4/1986 Kirkland .................................. 441/8

OTHER PUBLICATIONS

Richard, J. D., Delayed Release Device for Use in Trap Fisheries, (1971), Journal du Conseil, 33(3): pp. 492-505.

Primary Examiner—Kurt Rowan

[57] ABSTRACT

A self-destructing fish hook having a selected small anodic area of exposed steel, and a highly cathodic plating covering a much larger area of the hook surface. When immersed in seawater, the resulting galvanic couple causes the small anodic area to corrode rapidly and the hook to eventually break. In a preferred embodiment, a temporary protective coating is provided for at least one member of the couple to delay the onset of corrosion of the steel anodic area so that the hook can retain 100 percent of its strength for a substantial period of usage in seawater before corrosion of the steel body is initiated.

11 Claims, 10 Drawing Figures

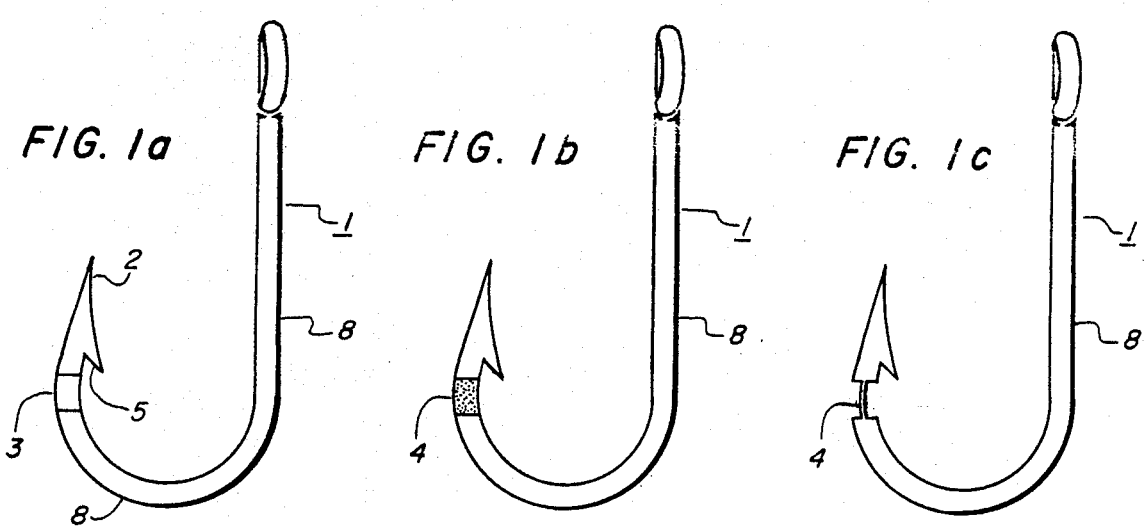
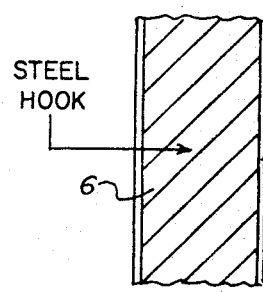
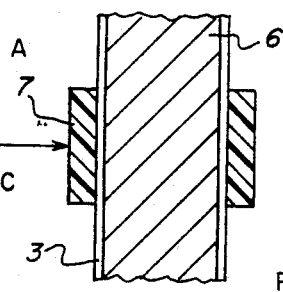
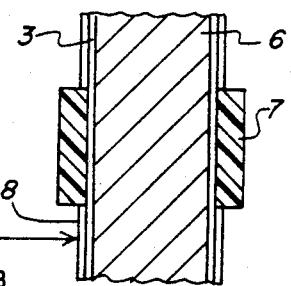
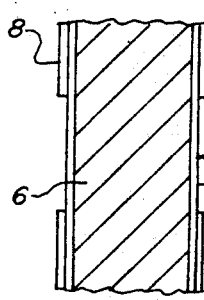
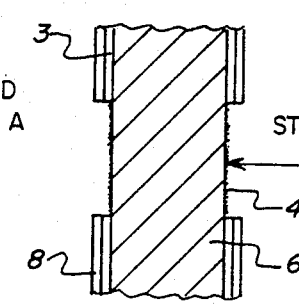
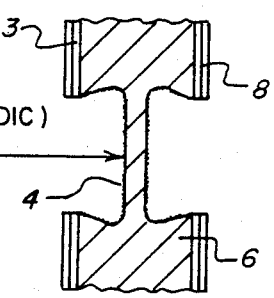
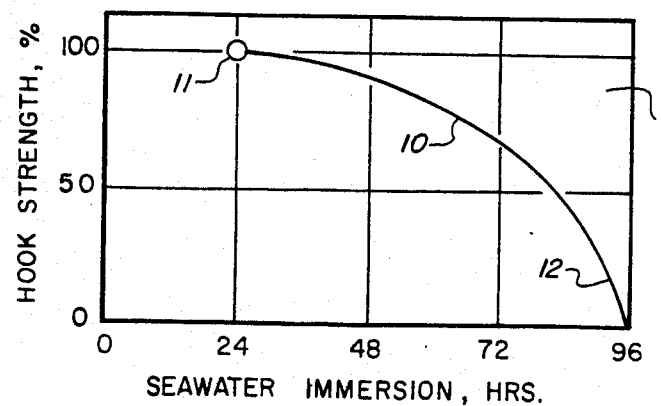

SELF-DESTRUCT FISH HOOK

BACKGROUND OF THE INVENTION

In recent years, commercial and sport fishery resources have declined considerably and various conservation measures are now practiced in an attempt to slow down the decline. One such measure is the release of fish after capture. More often, those fish species caught principally for sport are released, but those valued as food are also sometimes released when the catch is excessive. In any event, releasing fish, hopefully unharmed, has become a common conservation practice in many of the sport fisheries.

Obviously, it is preferable to remove the hook from captured fish before they are released, and the smaller inshore fishes can be easily netted when captured to facilitate hook removal. However, the larger oceanic fishes generally cannot be netted, and hook removal is therefore more difficult. Gaffing or otherwise bringing such fish aboard for hook removal is often too stressful and many such fish die soon after being released. Therefore in the oceanic big game fisheries it has become the preferred practice to cut loose the fishing line or leader when the fish is close alongside the boat, leaving the hook embedded in the fish.

In addition to the deliberate and purposeful release of fishes with embedded hooks, there is also the problem of inadvertent line breakage while fishing. The added burden of a length of fishing line attached to the embedded hook presumably further reduces the fish's chances of survival. In sport fisheries, it is commonly the objective to catch ever larger fish with the lowest possible test line, and this form of competitive fishing has also contributed to the overall problem.

In any event, it is now known that an embedded hook in a free swimming fish can take many months to disintegrate, depending on the steel composition and the protective plating. Meanwhile, possible adverse effects of the embedded hook with its attached remnant of line or leader could include impairment of feeding behavior and/or ulceration or infection of the hook wound. It seems likely that these cumulative effects significantly reduce the chances of survival of released fish.

Because seawater is an excellent electrolyte, severe corrosion can occur when two different metals are coupled together underwater. One metal in the couple will be anodic to the other and the degree of corrosion depends partly on the relative position of the two metals in the galvanic series for seawater. Usually, the farther apart in the series (i.e., the greater the difference in potential) the greater will be the acceleration of the corrosion rate of the anodic member of the couple. A carbon steel fish hook is anodic when coupled to a less active (cathodic) metal such as nickel, silver, or gold. The corrosion rate is controlled by the nobility of the cathode metal and on the ratio between the cathodic and anodic surface areas exposed to sea water. A smaller anodic (steel) area coupled to a larger cathodic (e.g., gold) area immersed in seawater will result in a greatly increased rate of corrosion attack on the anode. Conversely, a small cathode area coupled to a large anode area will have only a minor influence on the rate of corrosion.

SUMMARY OF THE INVENTION

To enhance the surviveability of released fish, the present invention provides a method for greatly increasing the rate at which fish hooks used in the sport fisheries will degrade after immersion in seawater. Although the method can conceivably be applied to some stainless steel alloys used in hook manufacture, the stronger and more common steel or carbon steel hooks are much preferred in the practice of the present invention. In this method, at least one small section of the surface of the steel fish hook is designated as an anodic area where rapid corrosion and eventual hook breakage is desirable. For example, one such location is in the bend of the hook adjacent to the barb. Another suitable anodic area is the entire end of the hook, including the point, barb, and a small adjacent section of the bend. The selected anodic area is then temporarily protected, for example with a plastic coating mask and the remaining much larger surface of the hook is electroplated, or otherwise plated, with a highly cathodic (more noble) metal. When the temporary plastic coating mask is removed from the small anodic area, the hook surface then comprises a small anodic area of unprotected steel and a much larger surface area of highly cathodic metal. When the hook is subsequently immersed in seawater, a galvanic couple is formed which results in the rapid corrosion of the anodic area and eventual breakage of the steel hook at that location. For example, a high rate of corrosion can be concentrated on the selected small area of exposed steel (anode) if a gold plating (cathode) of larger area covers the remainder of the hook surface.

In one preferred embodiment of the present invention, a thin metallic layer intermediate between gold and steel in the galvanic series for seawater (e.g., nickel, bronze, copper, or tin) is applied to the steel body of the hook to cover at least the small anodic area before the cathodic (gold) plating is applied to the remaining surface area of the hook. When the hook is immersed in seawater, the intermediate metallic layer, being less anodic than steel, corrodes relatively slower, meanwhile affording temporary protection to the underlying steel anodic area. This allows the hook to retain 100% of its strength until the intermediate layer is depleted and the underlying steel starts to corrode.

BRIEF DESCRIPTION OF THE DRAWINGS

FIG. 1a shows a self-destruct fish hook according to the present invention before immersion in seawater.

FIG. 1b shows the fish hook of FIG. 1a after a relatively brief immersion in seawater.

FIG. 1c shows the fish hook of FIG. 1b after a period of several days immersion in seawater.

FIG. 2a shows a sectional view of a short segment of a steel fish hook with a protective metal plating.

FIG. 2b shows a sectional view of the fish hook of FIG. 2a in which a small annular surface is covered by a plastic band.

FIG. 2c shows a sectional view of the fish hook of FIG. 2b which has been plated with a highly cathodic metal except for the small annular surface protected by a plastic band.

FIG. 2d shows a sectional view of the fish hook of FIG. 2c in which the protective plastic band has been removed.

FIG. 2e shows a sectional view of the fish hook of FIG. 2d after a relatively brief exposure to seawater.

FIG. 2f shows a sectional view of the fish hook of FIG. 2e after a period of several days immersion in seawater.

FIG. 3 shows graphically the progressive loss of hook strength during immersion in seawater for the self-destruct fish hook described in FIGS. 1 and 2.

DESCRIPTION OF THE PREFERRED EMBODIMENTS

In FIG. 1a, a self-destruct fish hook is shown in which a fish hook of conventional shape, steel composition, and protective metal plating has been further processed to provide an additional plating of a highly cathodic metal covering most of the outer surface of the hook except for a small annular area near the barb designated to remain anodic. For example, a conventional hook of carbon steel 6 plated with cadmium/tin 3 is further electroplated with gold 8 leaving a smaller annular anodic area near the barb 5 with the underlying cadmium/tin plating 3 exposed. Since tin is intermediate between steel and gold on the galvanic series in seawater, the exposed tin plating provides only temporary protection to the underlying steel 6 so that after a relatively brief period of immersion in seawater the small anodic area of steel 4 is exposed as shown in FIG. 1b. The small anodic area of exposed steel 4 forms a more active galvanic couple with the larger cathodic area 8 resulting in the rapid corrosion through the steel body of the hook as shown in FIG. 1c. A considerably longer period of temporary protection can be obtained if a more passive metal such as copper, bronze, or nickel is used in place of cadmium/tin for the intermediate plating 3.

FIG. 2 shows several sectional views of a short segment of the hook body shown in FIG. 1, including the designated small anodic area. FIG. 2 is not drawn to scale as the plating thicknesses are greatly exaggerated. In FIG. 2a the conventional steel 6 hook body is covered with a protective metal plating 3. In FIG. 2b a plastic band 7 covers an annular section of the hook surface designated to be the small anodic area. In FIG. 2c, a highly cathodic metal plating 8 has been applied over the metal plating 3 except for the annular surface protected by the plastic band 7. In FIG. 2d, the plastic band 7 has been removed so that an annular surface of exposed metal plating 3 defines a relatively small anodic area subject to corrosion when immersed in seawater because of the galvanic coupling with the much larger area of cathodic plating 8. FIG. 2e shows an annular surface of exposed steel 4 after the metal plating 3 in FIG. 2d was immersed in seawater for a relatively brief period of time, e.g., 24 hours. FIG. 2f shows the highly corroded annular surface of exposed steel 4 after several days immersion in seawater as a result of the galvanic coupling with the cathodic plating 8.

FIG. 3 is a graph 9 showing the relationship 10 between elapsed immersion time in seawater and hook strength for the self-destruct fish hook shown in FIGS. 1 and 2. After immersion in seawater, a delay period of 24 hours is shown representing the time required for the metal plating 3 to corrode away to expose the underlying steel body of the hook. When the more anodic annular surface of steel 4 is exposed, a more active galvanic couple is formed with the highly cathodic plating 8 so that the hook rapidly loses strength to eventually break at the point 12.

Presently, almost all fish hooks are plated with at least one metallic layer for protection of the steel body of the hook from corrosion under humid conditions. Metals most often used are cadmium (anodic to steel in seawater) and tin, bronze, nickel, and gold, which are increasingly cathodic to steel. Often an additional intermediate plating is included (sometimes of copper) to improve the adhesion and surface quality of the outer protective plating. The technology of electroplating and other methods of metallic plating in general, and on fish hooks in particular, are so well known to those skilled in the art that any detailed description here would be only redundant. Additionally, the relative positions of these various metals in the galvanic series, and how they interact when coupled and immersed in seawater are also well known to those skilled in the art.

ALTERNATIVE PRACTICE OF THE INVENTION

In the simplest form of the present invention, most of the surface of a steel fish hook is plated with a substantially more cathodic metal, leaving at least one relatively small area of the steel surface unprotected. For example, where rapid corrosion of the anodic exposed steel is desired, gold is a preferred cathodic plating because of its nobility. Alternatively, any other highly noble metal (including graphite) can be used to provide cathodic surface. Where a much slower corrosion rate of the exposed steel is desired, nickel is suitable as a cathodic plating.

Generally, it is desirable to delay the onset of corrosion of the steel body of the hook so that it retains 100 percent of its strength through a reasonable period of usage. Therefore, in one preferred practice of the present invention a coating is provided for temporarily protecting the small anodic area after immersion in seawater. In one method as shown in the Figures, at least one intermediate metallic layer somewhat more passive than steel is used to provide temporary protection for the steel anodic area. For example, where gold is the cathodic outer plating, a thin layer of copper, nickel, bronze, or tin can provide temporary protection for the underlying steel of the anodic area. Obviously, the period of protection provided by the intermediate plating depends on the relative passivity of the metal used and the thickness of the plating.

Protection of the steel anodic area can also be provided by covering the cathode with a temporary coating, either inorganic or organic, which deteriorates within a few days of hook use in seawater. Possible mechanisms for deterioration of the temporary cathode covering include galvanic interaction, dissolution in seawater, or by means of mechanical disruption or chemical reaction after being embedded in fish bone or flesh. Ideally, a self-destruct fish hook would retain 100 percent of its strength until it becomes embedded in a fish, and only then would it start to degrade at the maximum rate. Therefore, one preferred method for delaying the onset of corrosion of the anodic area is to provide a relatively fragile plastic sleeve to cover the shaft of the hook, including at least a portion of the cathode area, thus blocking the seawater path of the galvanic circuit. When the hook becomes embedded in a fish, the fragile plastic sleeve is stripped away or otherwise disrupted by mechanical agitation, or by chemical reaction with fish tissue, so that the circuit is completed to allow corrosion of the anodic area. As a further advantage, as long as the temporary cathode covering is intact, the point of the fish hook can be re-sharpened without concern that it will subsequently corrode at an abnormal rate through galvanic coupling with the cathode.

As an alternative to the use of an electroplated intermediate layer for temporarily protecting the steel anodic area, other protective coatings can be used. For example, a fragile plastic sleeve covering the anodic area can be used to delay the onset of corrosion until it is mechanically or chemically disrupted when the hook is embedded in fish bone or tissue. As another example, after the gold cathodic plating is applied and the anodic area mask is removed, an exposed steel anodic area can be oxidized or phosphatized to form a layer of oxide or phosphate respectively which can temporarily protect the underlying steel after immersion in seawater. Where a cadmium plated steel fish hook has been previously masked and gold plated, the exposed cadmium plated anodic area can then be chromated to protect the thin layer of cadmium which otherwise would corrode away very rapidly. A greenish-yellow layer of basic chromate with a thickness of 0.02 to 0.04 mil can provide temporary protection for the anodic area after immersion in seawater. Obviously, many other protective coatings could be used as alternatives for temporarily covering the anodic area (or cathode) to provide a delay period before the onset of corrosion of the steel body of the fish hook after immersion in seawater.

Whatever the method used to provide temporary protection for the underlying steel anodic area, the fisherman can easily recognize when the steel body of the hook begins to corrode and lose strength because at that time the familiar color of iron oxide first appears covering the exposed anodic area. Although a single small annular surface is shown in the Figures as an example to show a surface area ratio which provides a high corrosion rate, a somewhat larger portion of the hook surface can be designated as the anodic area if a slower corrosion rate is desired. Alternatively, more than one small anodic area can be designated so that an abandoned fish hook immersed in seawater will eventually break at those locations.

Fishermen often prefer to sharpen the point of a fish hook before use. Whenever a conventional steel fish hook plated with gold or nickel is sharpened, the point is stripped of its protective covering, and when immersed in seawater corrosion (rust) will concentrate on the exposed steel point. In the practice of the present invention, the hook can be well sharpened when manufactured and the hook point protected with a blob of easily removed plastic until used so that further sharpening may be unnecessary. However, if the hook is re-sharpened during use, the point can be pressed into a cake of beeswax to provide a temporary wax coating and protection from rust for at least several hours of fishing before the process might need repeating.

One advantage to the use of a temporary covering over the cathode area to delay the onset of corrosion of the anodic area (as mentioned previously) is that it would also protect the point of a re-sharpened hook from accelerated corrosion as long as the cathode covering remained essentially intact. If the point end of the hook is anodic and the shank cathodic, and the point end is plated with a sacrificial metal (i.e., anodic to steel in seawater) such as cadmium or "perma-plate," the re-sharpened point (exposed steel) will be protected from rust by the adjacent small area of exposed sacrificial metal as long as the cathode remains covered. Therefore, one preferred practice of the present invention includes a non-bonding (easily stripped) fragile plastic covering, or a thin plastic (e.g., latex) dip coating, covering the shank of the hook, including the cathode surface.

While only certain preferred embodiments are shown and described herein, it is understood that many other modifications are possible and the invention is not limited to the specific structure shown, nor otherwise, except as set forth in the following claims.

What I claim is:

1. A self-destruct fish hook of the character described comprising:
   a fish hook having a predominantly steel body and conventional shape;
   a cathode covering a substantial portion of the surface of said fish hook, said cathode comprising a metal coating substantially noble galvanically with respect to the steel body of said fish hook; and
   an anodic area including a relatively smaller portion of the surface of said fish hook separate from said cathode and which is active galvanically with respect to said cathode; whereby
   said cathode and said anodic area form a galvanic couple when immersed in seawater characterized by the rapid corrosion of said anodic area and the progressive weakening of said fish hook.

2. The self-destruct fish hook of claim 1 wherein:
   said cathode comprises a gold plating on the surface of said fish hook.

3. The self-destruct fish hook of claim 1 wherein:
   said substantially noble cathode comprises a non-auriferious metal plating on the surface of said fish hook.

4. The self-destruct fish hook of claim 1 wherein:
   said anodic area comprises a relatively small area of exposed steel on the surface of said hook.

5. The self-destruct fish hook of claim 1 wherein:
   said anodic area comprises an exposed portion of an intermediate metal plating covering the steel body of said hook.

6. The self-destruct fish hook of claim 1 wherein:
   said cathode comprises a graphite plating on the surface of said fish hook.

7. A self-destruct fish hook of the character described comprising;
   a fish hook having a predominantly steel body and conventional shape;
   a cathode covering a substantial portion of the surface of said fish hook, said cathode comprising a metal coating substantially noble galvanically with respect to the steel body of said hook;
   an anodic area including a relatively smaller portion of the surface of said fish hook separate from said cathode which is active galvanically with respect to said cathode; and
   means for delaying the onset of corrosion of the steel body of said hook beneath said anodic area after said hook is immersed in seawater; whereby
   said cathode and the steel body of said hook beneath said anodic area eventually form a galvanic couple after a period of immersion in seawater.

8. The self-destruct fish hook of claim 7 wherein:
   said means for delaying the onset of corrosion of the steel body of said hook beneath said anodic area after immersion in seawater comprises a metallic plating covering said anodic area which is more passive galvanically than the steel body of said hook.

9. The self-destruct fish hook of claim 7 wherein:
   said means for delaying the onset of corrosion of the steel body of said hook after immersion in seawater comprises a substantially fragile plastic covering over the surface of said cathode to temporarily block the galvanic corrosion of said anodic area.

10. The self-destruct fish hook of claim 7 wherein: said means for delaying the onset of corrosion of the steel body of said hook after immersion in seawater comprises a temporary protective covering over said anodic area.

11. The method for accelerating the degradation rate of abandoned fish hooks embedded in free swimming fish which comprises:

designating at least one relatively small area on the surface of a steel fish hook as an anodic area where accelerated corrosion and eventual breakage is desired; and applying a highly cathodic metal plating to a relatively larger area on the surface of said hook separate from said anodic area; whereby said anodic and cathodic surfaces comprise a galvanic couple when immersed in seawater characterized by the rapid corrosion of the anodic member of the couple.

* * * * *